United States Patent [19]

Ferree, Jr. et al.

[11] 4,251,276
[45] Feb. 17, 1981

[54] THERMALLY ACTIVATED INK AND TRANSFER METHOD

[75] Inventors: William I. Ferree, Jr.; Giao V. Nguyen, both of Dallas, Tex.

[73] Assignee: Liquid Paper Corporation, Dallas, Tex.

[21] Appl. No.: 72,691

[22] Filed: Sep. 5, 1979

[51] Int. Cl.$^3$ .................. B41M 5/26; C09D 11/10
[52] U.S. Cl. .................. 106/27; 260/18 N; 106/20; 106/32; 400/120; 400/241; 400/241.2
[58] Field of Search .............. 260/18 N; 106/32, 27, 106/20; 400/120, 241, 241.2

[56] References Cited

U.S. PATENT DOCUMENTS

| | | | |
|---|---|---|---|
| 2,499,004 | 2/1950 | Sell et al. | 106/32 |
| 2,545,125 | 3/1951 | Dusen | 400/241 |
| 2,989,493 | 6/1961 | Clark et al. | 106/27 |
| 3,080,954 | 3/1963 | Newman et al. | 400/241.2 |
| 3,282,709 | 11/1966 | Ehrhardt et al. | 106/27 |
| 3,330,791 | 7/1967 | Mater et al. | 101/336 |
| 3,639,313 | 2/1972 | Gruben et al. | 106/27 |
| 3,719,261 | 3/1973 | Heinzer et al. | 400/120 |
| 3,857,470 | 12/1974 | Bastard et al. | 400/120 |
| 3,900,436 | 8/1975 | Drawert et al. | 106/27 |
| 3,914,195 | 10/1975 | Hsai et al. | 106/27 |
| 3,957,495 | 5/1976 | Terganishi et al. | 106/32 |
| 3,995,729 | 12/1976 | Anton et al. | 400/120 |
| 4,066,585 | 1/1978 | Schepp et al. | 106/27 |

*Primary Examiner*—V. P. Hoke
*Attorney, Agent, or Firm*—Richards, Harris & Medlock

[57] ABSTRACT

A thermally activated ink and a thermally activated transfer ribbon, comprising a polymer, oil and oil-gelling agent, are provided. The ink may form a coating on a substrate, such as a ribbon, for use in conjunction with a thermal printer or a nonimpact typewriter, for example, for generating characters on ordinary paper. A method is also provided for generating characters on ordinary paper with a thermal print head.

41 Claims, No Drawings

THERMALLY ACTIVATED INK AND TRANSFER METHOD

BACKGROUND OF THE INVENTION

Thermal printing, because of its simplicity and low-noise level, has potentially many advantages over existing printing methods as a low-cost and relatively noise-free method of printing and generating characters. However, the acceptance of thermal printing has not been rapid because of the need for special paper and the nonpermanence of the heat-sensitive paper that is required for thermal printing.

Therefore, a need exists for a thermally activated ink, transfer ribbon and printing method for generating printed characters on ordinary paper. Present commercialized thermal printing can produce only blue or blue-black dye images of low to moderate darkness and opacity. Therefore, a need also exists for a thermal printing ink and method for producing black images having improved contrast and readability qualities. A need further exists for a thermally activated ink and method for producing high-quality, non-smudgeable, permanent characters on ordinary paper which characters are flexible and elastic to avoid flaking.

SUMMARY OF THE INVENTION

A thermally activated ink is provided which can be used, for example, in a thermally activated transfer ribbon or thermally activated typewriter ribbon. In another aspect, the present invention provides a method for producing black thermal transfer images having improved contrast and readability.

In still another aspect, the invention provides a thermally activated ink and transfer ribbon which is able to generate printed characters on ordinary paper. In another aspect, the invention provides a thermally activated ink and transfer ribbon for producing non-smudging images for permanent, high-quality documents.

As used herein, "thermally activated ink" is an ink which is solid or dry at ambient temperatures but which ink is a fluid above about 130° F. to 140° F. The thermally activated ink compositions of the present invention have sharp melting points to insure that when generating characters, the ink will set quickly to a non-smudgeable, firm solid. The ink compositions according to the present invention are also slightly flexible and elastic so that flaking of the printed characters is avoided.

One embodiment of the present invention comprises a thermally activated ink comprising a polymer, oil and oil-gelling agent. The polymer has a relatively low molecular weight and a low softening point but is a solid at room temperature. In accordance with the present invention, the gelling agent has a relatively low melting point but is also a solid at room temperature. The oil present in the composition of the present invention serves to lower the softening range of the polymer. Preferably, the oil is also a solid at room temperature but has a melting point less than about 100° C.

According to the present invention, the polymer is a polyamide resin or a styrene-allyl alcohol copolymer, having a molecular weight of from about 1,000 to about 10,000. The preferred gelling agent in the ink composition is 12-hydroxystearic acid and the preferred oil is 1-eicosene.

Additional components which are generally present in the thermally activated ink compositions of the present invention include plasticizers, thickeners, pigments, dispersants and, optionally, dyes to tone or intensify color and solvents.

In another embodiment of the present invention, the thermally activated ink composition forms a film coating on a substrate or support film. The combination of the substrate and the thermally activated ink composition can be used as a thermally activated transfer ribbon in, for example, a thermal printer or typewriter, or other types of thermal printing devices which employ ribbons to generate characters.

DETAILED DESCRIPTION OF THE INVENTION

According to the invention, a thermally activated ink composition, thermally activated transfer ribbon and thermally activated transfer method are provided. The thermally activated ink compositions of the present invention comprise a synthetic polymer, an oil, an oil-gelling agent, and optionally, a solvent for the polymer and oil. In the preferred compositions, specific rheology modifying materials, including plasticizers, thickeners and dispersants, are included to provide improved transfer and adherent characteristics. In addition to the presence of a suitable pigment, a color toner may also be present in the thermally activated ink compositions of the present invention.

The polymer used in the composition according to the present invention has a relatively low molecular weight and a low softening point but is a solid at room temperature and is thermally stable. "Thermally stable" as used herein means that the polymer does not decompose between about 10° C. and about 180° C. The polymer present in the composition of the present invention is either a polyamide resin or a styrene-allyl alcohol copolymer, having a molecular weight of from about 1,000 to about 10,000 and a softening point of from about 50° C. to about 125° C.

The preferred polyamide resins used in the composition of the present invention have a molecular weight of from about 3,000 to about 5,000 and are prepared by reacting dimerized fatty acids with mixtures of linear aliphatic diamines. Two specific preferred polyamides are sold by the Crosby Chemical Company of New Orleans, La., under the trade names "Cropolamid 226" and "Cropolamid 228", and are prepared by reacting tall oil dimer acid with mixtures of linear aliphatic diamines. Cropolamid 226 has a ring-and-ball softening point of from about 95° C. to about 105° C. and a viscosity of about 500 centipoises to about 700 centipoises at 160° C. Cropolamid 228 has a ring-and-ball softening point of from about 100° C. to about 110° C. and a viscosity of from about 500 centipoises to about 700 centipoises. Another specific preferred polyamide is sold by Victor Wolf Limited of Clayton, Manchester, in Great Britain, under the trade name "Wolfamid 8W", and is prepared by reacting dimerized vegetable oil fatty acids with a mixture of linear aliphatic diamines. Wolfamid 8W has a ring-and-ball softening point of from about 95° C. to about 105° C. and a viscosity of from about 300 centipoises to about 800 centipoises at 160° C.

The preferred styrene-allyl alcohol copolymer for use in the composition according to the present invention has a number-average molecular weight of about 1,600, a hydroxyl content of from about 5.4% to about 6.0% and a Durran softening point of from about 100°

C. to about 110° C. This component can be obtained commercially from Monsanto Industrial Chemicals Company of St. Louis, Mo., under the trade designation "RJ-100." The preferred styrene-allyl alcohol copolymer may also be obtained from Aldrich Chemical Company, Inc. of Milwaukee, Wis. Another commercial styrene-allyl alcohol copolymer which can be used in the composition of the present invention has a number-average molecular weight of 1,150 and a hydroxyl content of from about 7.4% to about 8.0%, sold by Monsanto Industrial Chemicals Company of St. Louis, Mo., under the trade designation "RJ-101." However, this copolymer is less satisfactory than the other two preferred styrene-allyl alcohol copolymers because it imparts more brittleness to the ink formulation than is usually desired.

The polymer in the ink composition of the present invention is present in an amount of from about 25% to about 45% by weight of the total nonvolatile components and is preferably present in an amount of about 31.8% by weight of the total ink nonvolatile components. As used herein, nonvolatile ink components include all ink components as set forth in this Description except for the solvent.

The oil present in the composition of the present invention is preferably a long chain hydrocarbon that is a solid at ambient temperature. The melting point of the oil is preferably between about 25° C. and less than about 100° C. The preferred oil for use in the composition of the invention is 1-eicosene which is a long chain hydrocarbon and has a melting point of about 30° C. 1-Eicosene is sold in an industrial grade under the trade name C-20 Alpha Olefin by the Gulf Oil Chemicals Company of Houston, Texas, and also under the trade name Neodene C-20 by the Shell Chemical Company of Houston, Tex. Other oils which can be used in the composition of the present invention include mineral oil, or the like. Still other oils which can be used in the composition of the present invention are sold by the Shell Chemical Company of Houston, Texas, under the trade names Neodene C-18 and Neodene C-16, both of which are liquid at ambient temperature. Oils which are a solid at ambient temperature are preferred because these oils have less tendency to separate from the other components in the composition and, therefore, compositions according to the invention that contain an oil which is a solid at room temperature will usually have a longer shelf life. According to the invention, the oil is present in the ink composition in an amount of from about 12% to about 26% and preferably the oil is present in an amount of about 19.1% by weight of the total ink nonvolatile. The oil present in the ink composition is a "dissolving medium" for both the polymer and gelling agent, hereinafter described. As used herein, "dissolving medium" means a component which is capable of forming a homogeneous mixture with other components, specifically the polymer and gelling agent.

The gelling agent present in the ink composition of the present invention is a long chain hydrocarbon containing two or more polar groups (—OH, —CO$_2$H). In addition, the gelling agent should be a solid at room temperature and have a relatively low melting point, preferably from about 40° C. to about 100° C. The gelling agent is present in the composition of the present invention in an amount of from about 6% to about 13% and preferably in an amount of about 9.5% by weight of the total ink nonvolatile components. The preferred gelling agent is 12-hydroxystearic acid. 12-hydroxystearic acid is a C$_{18}$ straight chain fatty acid with an —OH group attached to the hydrocarbon chain, having a melting point of from about 79° C. to about 82° C. Other gelling agents which may be used in the composition of the present invention include: 11-hydroxypalmitic acid; ω-hydroxylauric acid; 11-hydroxyundecanoic acid; 2-hydroxytetradecanoic acid; 15-hydroxypentadecanoic acid; 2-hydroxyhexadecanoic acid; 16-hydroxyhexadecanoic acid; 2-hydroxydodecanoic acid; 9,11-dihydroxyundecanoic acid; 3,11-dihydroxytetradecanoic acid; 11-hydroxytetradecanoic acid; 16-hydroxypalmitic acid; 14-hydroxypalmitic acid; 2-hydroxypalmitic acid; and combinations thereof. The presence of the gelling agent in the thermally activated ink composition of the present invention serves to lower the melting point of the polymer and improve the compatibility of the oil and polymer.

Preferably, the thermally activated ink composition of the present invention includes a plasticizer which is present in an amount of from about 9% to about 16% by weight of the total ink nonvolatile components and preferably about 12.7% by weight of the total ink nonvolatile components. The plasticizer serves to increase the flexibility and transferability of the ink composition. The plasticizer should be capable of plasticizing the polymer to increase its adhesion when applied to a substrate or backing, as will be hereinafter described in greater detail. The plasticizer also serves, in combination with the oil, to lower the softening point of the polymer and gelling agent. According to the present invention, the preferred plasticizer is dipropylene glycol dibenzoate. Dipropylene glycol dibenzoate is sold under the trade name Benzoflex 9-88 by the Velsicol Chemical of Chicago, Ill. Also, for thermally activating ink compositions based on the polyamide resins, a mixture of N-ethyl-ortho-toluene sulfonamides and N-ethyl-paratoluene sulfonamides is suitable for use as a plasticizer and is sold under the trade name of "Santicizer 8" by Monsanto Industrial Chemicals Company of St. Louis, Mo. For thermally activated ink compositions based on a styrene-allyl alcohol copolymer, dioctyl phthalate or benzyl butyl phthalate may be used as the plasticizer of the composition.

The composition of the present invention may optionally include a solvent for the polymer and gelling agent. The preferred solvent for the ink composition containing a polyamide resin is a combination of toluene and isopropyl alcohol in a ratio of toluene to isopropyl alcohol of 3:1. For an ink composition containing a styrene-allyl alcohol copolymer, the preferred solvent is toluene. The solvent should be present in an amount of from about 50% to about 85% by weight of the total ink composition and is preferably present in an amount of from 65.8% by weight of the total ink composition.

The primary purpose of the solvent in the ink composition of the present invention is to facilitate coating the compositions on a film base or substrate. A significant advantage of the ink composition described is that it can be ground and coated onto a film base while either dissolved in solvent, or without solvent while molten. The use of solvent is advantageous when low viscosities and thin, uniform coatings, less than 0.0002 inch, are desired. Hot-melt grinding and coating are sometimes advantageous for reasons of economy and to avoid the flammability and vapor emissions of organic solvents. When the ink is applied as a hot-melt, the ink is formulated without a solvent and is heated to a temperature in excess of its melting point so that the ink is in fluid form when applying it to a substrate.

To obtain the desired rheological properties, a thickener is also present in the ink composition of the present invention. The thickener preferably comprises hydrophobic fumed silica or fumed silica and has a particle size when present in the final ink composition of about 19 microns or less or a Hegmann reading of 6.5 or better. One suitable thickener is a hydrophobic fumed silica sold under the trade name "Aerosil R-972" by Degussa, Inc., Chemicals Division, of New York, N.Y. One specific fumed silica suitable for use as a thickener according to the present invention is sold under the trade name "Cab-O-Sil" by the Cabot Corporation of Boston, Mass. The thickener should be present in an amount of from about 1% to about 3% by weight of the total ink nonvolatile components and is preferably present in an amount of about 1.3% by weight of the total ink nonvolatile components.

In order to facilitate pigment wetting and grinding, and to improve the flow of melted ink from, for example, a substrate to paper, a dispersant is preferably present in the composition of the present invention. One suitable dispersant is lecithin. One commercial grade of lecithin which can be used in accordance with the composition of the present invention is sold by the Spencer Kellog Division of Textron, Inc. of Buffalo, N.Y. under the trade name "Kelecin F." The dispersant should be present in the ink composition according to the invention in an amount of from about 0.1% to about 0.2% and is preferably present in an amount of about 0.19% by weight of the total ink nonvolatile components.

When a commercial grade oil is used, such as Neodene C-20, Neodene C-18, Neodene C-16 or C-20 Alpha Olefin, generally the oil will contain a small percentage of heavier and lighter hydrocarbons. Because of this, it is often advantageous to include in the ink composition a slightly greater amount of the plasticizer than would be used in an ink composition containing a laboratory grade oil for improved adhesion, transferability and compatibility of the ink composition.

In order to provide the desired ink color, a pigment is present in an amount of from about 15% to about 25% by weight of the total ink nonvolatile components and preferably is present in an amount of about 19.1% by weight of the total ink nonvolatile components. The ink composition of the present invention allows the use of carbon black as a pigment. Preferred pigments include furnace carbon black, alkali blue and iron blue. One preferred type of carbon black is sold by the Cabot Corporation of Boston, Mass., under the trade name "Mogul L." Another preferred type of furnace carbon black for use as a pigment in the composition of the present invention is sold by the Cities Service, Columbian Division of Akron, Ohio under the trade name "Raven 1255." Suitable types of blue pigments include, for example, iron blue sold by Hercules Inc. of Wilmington, Del., under the trade name "Hisperse X-3434" and a suitable alkali blue pigment is sold by Sherwin Williams Chemicals of Cleveland, Ohio, under the trade name "Powdura Blue CP."

The thermally activated ink composition of the present invention may optionally include a dye as a color toner or intensifier. Typical color toners which may be used in accordance with the composition of the present invention include, for example, Nigrosine Oleate marketed by Dye Specialties of Secaucus, New Jersey, Flushed Alkali Blue FL-14511 marketed by Sherwin Williams Co., Cleveland, Ohio, and Methyl Violet Oleate 2:1 marketed by Dye Specialties Co. of Secaucus, N.J.

In one embodiment of the present invention, the thermally activated ink composition forms a thin coating on one side of a substrate or support film, such as a ribbon, for example. In this manner, the thermally activated ink composition of the present invention can be used, for example, in conjunction with a thermal print head for generating printed characters upon ordinary paper.

The substrate or support film may be constructed of polyester, polyethylene, polypropylene, polyvinylchloride or other suitable materials. Since the ink and substrate combination according to the present invention is suitable for use in conjunction with a thermal print head for generating characters, it is desirable that the substrate have minimal thickness to facilitate heat transfer from the thermal print head through the substrate and to the thermally activated ink composition forming a coating on the substrate and adjacent the paper or surface upon which is desired to generate characters. Preferably, the substrate or supporting film has a thickness of from about 0.12 mil to about 0.75 mil. For practical use, the substrate must possess sufficient tensile strength so that failure of the substrate or ribbon is minimized. A preferred substrate or support film is sold under the trade name "Philjo 308" and "PJX 2074" sold by the Phillips Joanna Company of Ladd, Ill. Preferably the Philjo 308 has a thickness of about 0.45 mil. In addition, high density polyethylene, tensilized polyethylene terephthalate and non-tensilized polyethylene terephthalate are also suitable for use as the substrate or support film according to the present invention.

According to the present invention, the thermally activated ink compositions are preferably manufactured according to the following method. First, a "resin solution" is prepared by dissolving the polymer, gelling agent, oil, plasticizer, and dispersant in the solvent or solvent blend. A "premix" is prepared by grinding the thickener and the pigment. Preferably the "premix" is prepared by grinding the thickener and the pigment with about 45% of the "resin solution." The grinding may be accomplished by any suitable apparatus, such as a ball mill, shot mill or sand mill, for example. The ground mixture containing the thickener, pigment and part of the "resin solution" should have a Hegmann reading of 6.5 or better or a maximum particle size of about 19 microns. The final ink composition is prepared by mixing the "premix" containing part of the "resin solution" with the remainder of the "resin solution."

As previously described, the thermally activated ink may form a film coating on a substrate or film base to provide a thermal transfer ribbon which can be used with, for example, a thermal printer for producing characters on ordinary paper. The ink is preferably coated at ambient temperature of about 25° C. and at a relative humidity of from about 45% to about 65% and dried at about 80° C. When coating, for example, a ribbon with the ink composition of the present invention, care should be taken to insure that the ink is cooled and solidified before the ribbon is wound. Preferably, the amount of ink on the film when the ink is dried is from about 24 oz. of ink per 3000 sq. ft. of film to about 32 oz. weight of ink per 3000 sq. ft. of film.

Thermal printing or generation of characters with the thermally activated ink and transfer ribbon of the present invention requires close contact of the ribbon fact to the paper so that during the printing process the melted ink can efficiently flow onto the paper. For best readability and contrast, and for efficient transfer of the ink to the surface, a paper that is highly calendared and/or coated with clay and organic binder is recommended.

EXAMPLE 1

Preparation of Thermally Activated Ink Composition

| Component | Parts | Percent by Weight (Total Composition) | Percent by Weight Nonvolatile Components |
|---|---|---|---|
| Polymer - Cropolamid 226[1] | 6.00 | 14.63 | 39.45 |
| Gelling Agent - 12-hydroxystearic acid | 1.50 | 3.66 | 9.86 |
| Oil - 1-eicosene (laboratory grade) | 3.00 | 7.32 | 19.72 |
| Plasticizer - Benzoflex 9-88[2] | 1.50 | 3.66 | 9.86 |
| Thickener - Aerosil R-972[3] | 0.20 | 0.49 | 1.32 |
| Pigment - Raven 1255[4] | 3.00 | 7.32 | 19.72 |
| Dispersant - Kelecin F[5] | 0.01 | 0.02 | 0.07 |
| Solvent-3:1 blend of toluene and isopropyl alcohol | 25.79 | 62.90 | — |

[1]A polyamide resin prepared by reacting tall oil dimer acid with mixtures of linear aliphatic diamines and marketed by the Crosby Chemical Company.
[2]Dipropylene glycol dibenzoate marketed by Velsicol Chemical Corp.
[3]The hydrophobic fumed silica marketed by Degussa, Inc., Chemicals Division.
[4]Furnace Carbon Black marketed by Cities Service, Columbian Division.
[5]A commercial grade of lecithin marketed by Spencer Kellog Division of Textron, Inc.

The thermally activated ink composition having the above components was prepared by dissolving Cropolamid 226, 12-hydroxystearic acid, 1-eicosene, Benzoflex 9-88 and Kelecin F in the solvent to form a "resin solution." The "resin solution" was prepared by mixing the components of the "resin solution" at ambient temperature. The Aerosil R-972 and Raven 1255 components were ground by ball milling with 17.32 parts of the "resin solution" to form a "premix." The "premix" was ground until it had a Hegmann reading of 6.5 or better, or a maximum particle size of 19 microns or less.

The final ink was prepared by mixing the remaining 20.48 parts of the "resin solution" with the "premix" at ambient temperature.

EXAMPLE 2

A thermally activated transfer ribbon was prepared with the ink composition as formulated in Example 1 by coating the ink composition on 0.45 mil polyethylene copolymer film at a relative humidity of from about 45% to about 65% and dried in an oven at about 150° F. About 28 oz. of ink per 3000 sq. ft. of film was used.

EXAMPLE 3

Preparation of Thermally Activated Ink Composition

| Component | Parts | Percent by Weight (Total Composition) | Percent by Weight Nonvolatile Components |
|---|---|---|---|
| Polymer - Cropolamid 226[1] | 6.00 | 12.77 | 36.98 |
| Gelling Agent - 12-hydroxystearic acid | 1.50 | 3.19 | 9.24 |
| Oil - Neodene C-20[2] | 3.00 | 6.38 | 18.48 |
| Plasticizer - Benzoflex 9-88[3] | 2.50 | 5.32 | 15.41 |
| Thickener - Aerosil R-972[4] | 0.20 | 0.43 | 1.23 |
| Pigment - Raven 1255[5] | 3.00 | 6.38 | 18.48 |
| Dispersant - Kelecin F[6] | 0.03 | 0.06 | 0.18 |
| Solvent - 3:1 blend of toluene and isopropyl alcohol | 30.77 | 65.47 | — |

[1]See Example 1.
[2]Commercial grade 1-eicosene marketed by the Shell Chemical Co.
[3-6]See Example 1.

A thermally activated ink composition having the above formula was prepared as in Example 1. This ink is also similar to the ink of Example 1 except that a commercial grade oil was used in this example. Because the commercial grade oil contains a mixture of hydrocarbons lighter and heavier than 1-eicosene, this formula contains a greater amount of plasticizer and dispersant for imparting greater stability to the ink composition.

EXAMPLE 4

A thermally activated ink composition was prepared as set forth in Example 2 with the following composition:

| Component | Parts | Percent by Weight (Total Composition) | Percent by Weight Nonvolatile Components |
|---|---|---|---|
| Polymer - Cropolamid 226[1] | 5.00 | 10.87 | 31.80 |
| Gelling Agent - 12-hydroxystearic acid | 1.50 | 3.26 | 9.54 |
| Oil - Neodene C-20[2] | 3.00 | 6.52 | 19.07 |
| Plasticizer - Benzoflex 9-88[3] | 2.00 | 4.35 | 12.71 |
| Thickener - Aerosil R-972[4] | 0.20 | 0.44 | 1.27 |
| Pigment - Raven 1255[5] | 3.00 | 6.52 | 19.07 |
| Dispersant - Kelecin F[6] | 0.03 | 0.07 | 0.19 |
| Solvent - 3:1 blend of toluene and isopropyl alcohol | 30.27 | 65.80 | — |
| Color Toner - Nigrosine Oleate[7] | 1.00 | 2.17 | 6.35 |

[1-6]See Example 3
[7]Marketed by Dye Specialties Co.

EXAMPLE 5

A thermally activated ink composition having a blue pigment was produced as in Example 2, having the following formula:

| Component | Parts | Percent by Weight (Total Composition) | Percent by Weight Nonvolatile Components |
|---|---|---|---|
| Polymer - Cropolamid 226[1] | 5.00 | 10.64 | 29.90 |
| Gelling Agent - 12-hydroxystearic acid | 1.50 | 3.19 | 8.97 |
| Oil - Neodene C-20[2] | 3.00 | 6.38 | 17.94 |
| Plasticizer - Benzoflex 9-88[3] | 2.00 | 4.26 | 11.96 |
| Thickener - Aerosil R-972[4] | 0.20 | 0.43 | 1.20 |
| Blue Pigment - Hisperse[5] | 4.00 | 8.51 | 23.92 |
| Dispersant - Kelecin F[6] | 0.02 | 0.04 | 0.12 |
| Solvent - 3:1 blend of toluene and isopropyl alcohol | 30.28 | 64.42 | — |
| Color Intensifier - flushed alkali blue | 1.00 | 2.13 | 5.98 |

[1-4]See Example 3.
[5]An iron blue pigment marketed by Hercules, Inc.
[6]See Example 3.
[7]Marketed by Sherwin-Williams Co.

While the invention has been described with respect to its preferred embodiments, upon reading the specification it will become apparent that numerous changes, modifications and substitutions can be made and it is intended that they be covered by the invention as set forth in the appended claims.

We claim:
1. A thermally activated ink composition for use in generating printed characters on ordinary paper with a thermal printer comprising:
   (a) a thermally stable polymer having a molecular weight of from about 1,000 to about 10,000 and a softening point of from about 50° C. to about 125° C. selected from the group consisting of styrene- allyl alcohol copolymers and polyamide resins and present in an amount of from about 25% to about 45% by weight of the total nonvolatile ink components;

(b) an oil-gelling agent having a melting point of from about 40° C. to about 100° C., being further characterized as a carboxylic acid having eleven to eighteen carbon atoms and 1 to 2 hydroxy groups, said gelling agent being present in an amount of from about 6% to about 13% by weight of the total ink nonvolatile components; and (c) an oil that is a dissolving medium for said polymer and said gelling agent, and present in an amount of from about 12% to about 26% by weight of the total nonvolatile components.

2. The thermally activated ink composition as recited in claim 1 wherein said polymer has a molecular weight of from about 3,000 to about 5,000.

3. The thermally activated ink composition as recited in claim 2 wherein said polymer is selected from the group consisting of: polyamide resins prepared from reacting tall oil dimer acid with mixtures of linear aliphatic diamines; polyamide resins prepared from reacting dimerized vegetable oil fatty acids with mixtures of linear aliphatic diamines; and styrene-allyl alcohol copolymers.

4. The ink composition as recited in claim 1 wherein said polymer is a styrene-allyl alcohol copolymer having a molecular weight of about 1,600, a hydroxyl content of from about 5.4% to about 6.0% and a softening range of from about 100° C. to about 110° C.

5. The ink composition as recited in claim 2 wherein said polymer is prepared from reacting tall oil dimer acid with mixtures of linear aliphatic diamines and has a ring-and-ball softening point of from about 95° C. to about 105° C. and a viscosity of from about 500 centipoises to about 700 centipoises at 160° C.

6. The ink composition as recited in claim 2 wherein said polymer is a polyamide resin prepared from reacting dimerized vegetable oil fatty acids with mixtures of linear aliphatic diamines and has a ring-and-ball softening point of from about 95° C. to about 105° C. and a viscosity of from about 300 centipoises to about 800 centipoises at 160° C.

7. The ink composition as recited in claim 4, 5 or 6 wherein said polymer is present in an amount of about 31.8% by weight of the total ink nonvolatile components.

8. The thermally activated ink composition as recited in Claim 1, 2, 3, 4, 5 or 6 wherein said gelling agent is selected from the group consisting of 12-hydroxystearic acid, 11-hydroxypalmitic acid, ω-hydroxylauric acid, 11-hydroxyundecanoic acid, 2-hydroxytetradecanoic acid, 15-hydroxypentadecanoic acid, 2-hydroxyhexadecanoic acid, 16-hydroxyhexadecanoic acid, 2-hydroxydodecanoic acid, 9,10-dihydroxyundecanoic acid, 3,11-dihydroxytetradecanoic acid, 11-hydroxytetradecanoic acid, 16-hydroxypalmitic acid, 14-hydroxypalmitic acid, 2-hydroxypalmitic acid and combinations thereof.

9. The thermally activated ink composition as recited in claim 1, 2, 3, 4, 5 or 6 wherein said gelling agent is 12-hydroxystearic acid present in an amount of about 9.5% by weight of the total ink nonvolatile components.

10. The thermally activated ink composition as recited in claim 1, 2, 3, 4, 5 or 6 wherein said oil is a long chain hydrocarbon and has a melting point of from about 25° C. to about 100° C.

11. The thermally activated ink composition as recited in claim 1, 2, 3, 4, 5 or 6 wherein:

(a) said oil is 1-eicosene; and (b) said gelling agent is selected from the group consisting of 12-hydroxystearic acid, 11-hydroxypalmitic acid, ω-hydroxylauric acid, 11-hydroxyundecanoic acid, 2-hydroxytetradecanoic acid, 15-hydroxypentadecanoic acid, 2-hydroxyhexadecanoic acid, 16-hydroxyhexadecanoic acid, 2-hydroxydodecanoic acid, 9,10-dihydroxyundecanoic acid, 3,11-dihydroxytetradecanoic acid, 11-hydroxytetradecanoic acid, 16-hydroxypalmitic acid, 14-hydroxypalmitic acid, 2-hydroxypalmitic acid and combinations thereof.

12. The thermally activated ink composition as recited in claim 1 wherein:

(a) said gelling agent is selected from the group consisting of 12-hydroxystearic acid, 11-hydroxypalmitic acid, ω-hydroxylauric acid, 11-hydroxyundecanoic acid, 2-hydroxytetradecanoic acid, 15-hydroxypentadecanoic acid, 2-hydroxyhexadecanoic acid, 16-hydroxyhexadecanoic acid, 2-hydroxydodecanoic acid, 9,10-dihydroxyundecanoic acid, 3,11-dihydroxytetradecanoic acid, 11-hydroxytetradecanoic acid, 16-hydroxypalmitic acid, 14-hydroxypalmitic acid, 2-hydroxypalmitic acid and combinations thereof; and (b) said oil is selected from the group consisting of 1-eicosene and mineral oil.

13. The thermally activated ink composition as recited in claim 12 further comprising:

(a) a plasticizer present in an amount of from about 9% to about 16% by weight of the total ink nonvolatile components;

(b) a thickener present in an amount of from about 1% to about 3% by weight of the total ink nonvolatile components;

(c) a dispersant present in an amount of from about 0.1% to about 0.2% by weight of the total ink nonvolatile components; and (d) a pigment present in an amount of from about 15% to about 25% by weight of the total ink nonvolatile components.

14. The ink composition as recited in claim 13 wherein:

(a) said thickener is selected from the group consisting of fumed silica and hydrophobic fumed silica;

(b) said dispersant is lecithin; and (c) said pigment is selected from the group consisting of carbon black, alkali blue and iron blue.

15. The ink composition as recited in claim 13 or 14 further comprising a color toner.

16. The thermally activated ink composition as recited in claim 13, 14 or 15 wherein said composition forms a film on a substrate, said substrate being suitable for use in conjunction with a thermal print head for generating and transferring characters from the substrate to a surface.

17. The ink composition as recited in claim 13 wherein said polymer is a polyamide resin and said ink composition further comprises a solvent for the polymer, said solvent being present in an amount of from about 50% to about 85% by weight of the total ink composition.

18. The ink composition as recited in claim 17 wherein said solvent is a combination of toluene and isopropyl alcohol, said toluene and isopropyl alcohol being present in a ratio of toluene to isopropyl alcohol of about 3:1.

19. The ink composition as recited in claim 13 wherein said polymer is a styrene-allyl alcohol copolymer, said plasticizer is selected from the group consisting of dioctyl phthalate and benzyl butyl phthalate and said ink composition further comprises a solvent for the polymer, said solvent being present in an amount of from about 50% to about 85% by weight of the total ink composition.

20. A thermally activated transfer ribbon for generating printed characters on ordinary paper comprising:
 (a) a substrate; and
 (b) a thermally activated ink composition forming a film on one side of said substrate, said ink composition comprising a thermally stable polymer having a molecular weight of from about 1,000 to about 10,000 and a softening point of from about 50° C. to about 125° C. selected from the group consisting of styrene-allyl alcohol copolymers and polyamide resins and present in an amount of from about 25% to about 45% by weight of the total nonvolatile ink components, a gelling agent having a melting point of from about 40° C. to about 100° C., said gelling agent being further characterized as a carboxylic acid having eleven to eighteen carbon atoms and 1 to 2 hydroxy groups and present in an amount from about 6% to about 13% by weight of the total nonvolatile ink components and an oil that is a dissolving medium for said polymer and said gelling agent said oil present in an amount of from about 12% to about 26% by weight of the total nonvolatile ink components.

21. The thermally activated transfer ribbon as recited in claim 20 wherein said polymer has a molecular weight of from about 3,000 to about 5,000.

22. The thermally activated transfer ribbon as recited in claim 2 wherein said polymer is selected from the group consisting of: polyamide resins prepared from reacting tall oil dimer acid with mixtures of linear aliphatic diamines; polyamide resins prepared from reacting dimerized vegetable oil fatty acids with mixtures of linear aliphatic diamines; and styrene-allyl alcohol copolymers.

23. The thermally activated transfer ribbon as recited in claim 20 wherein said polymer is a styrene-allyl alcohol copolymer having a molecular weight of about 1,600, a hydroxyl content of from about 5.4% to about 6.0% and a softening range of from about 100° C. to about 110° C.

24. The thermally activated transfer ribbon as recited in claim 20 wherein said polymer is prepared from reacting tall oil dimer acid with mixtures of linear aliphatic diamines and has a ring-and-ball softening point of from about 95° C. to about 105° C. and a viscosity of from about 500 centipoises to about 700 centipoises at 160° C.

25. The thermally activated transfer ribbon as recited in claim 20 wherein said polymer is a polyamide resin prepared from reacting dimerized vegetable oil fatty acids with mixtures of linear aliphatic diamines and has a ring-and-ball softening point of from about 100° C. to about 110° C. and has a viscosity of from about 500 centipoises to about 700 centipoises at 160° C.

26. The thermally activated transfer ribbon as recited in claim 23, 24 or 25 wherein said polymer is present in an amount of about 31.8% by weight of the total ink nonvolatile components.

27. The thermally activated transfer ribbon as recited in claim 20, 21, 22, 23, 24 or 25 wherein said gelling agent is selected from the group consisting of 12-hydroxystearic acid, 11-hydroxypalmitic acid, ω-hydroxylauric acid, 15-hydroxypentadecanoic acid, 2-hydroxyhexadecanoic acid, 16-hydroxyhexadecanoic acid, 2-hydroxydodecanoic acid, 9,10-dihydroxyundecanoic acid, 3,11-dihydroxytetradecanoic acid, 11-hydroxytetradecanoic acid, 16-hydroxypalmitic acid, 14-hydroxypalmitic acid, 2-hydroxypalmitic acid and combinations thereof.

28. The thermally activated transfer ribbon as recited in claim 20, 21, 22, 23, 24 or 30 wherein said gelling agent is 12-hydroxystearic acid present in said ink composition in an amount of about 9.5% by weight of the total ink nonvolatile components.

29. The thermally activated transfer ribbon as recited in claim 20, 21, 22, 23, 24 or 25 wherein said oil is a long chain hydrocarbon and has a melting point of from about 25° C. to about 100° C.

30. The thermally activated transfer ribbon as recited in claim 20, 21, 22, 23, 24 or 25 wherein:
 (a) said oil is 1-eicosene; and
 (b) said gelling agent is selected from the group consisting of 12-hydroxystearic acid, 11-hydroxypalmitic acid, ω-hydroxylauric acid, 11-hydroxyundecanoic acid, 2-hydroxytetradecanoic acid, 15-hydroxypentadecanoic acid, 2-hydroxyhexadecanoic acid, 16-hydroxyhexadecanoic acid, 2-hydroxydodecanoic acid, 9,10-dihydroxyundecanoic acid, 3,11-dihydroxytetradecanoic acid, 11-hydroxytetradecanoic acid, 16-hydroxypalmitic acid, 14-hydroxypalmitic acid, 2-hydroxypalmitic acid and combinations thereof.

31. The thermally activated transfer ribbon as recited in claim 20 wherein:
 (a) said gelling agent is selected from the group consisting of 12-hydroxystearic acid, 11-hydroxypalmitic acid, ω-hydroxylauric acid, 11-hydroxyundecanoic acid, 2-hydroxtetradecanoic acid, 15-hydroxypentadecanoic acid, 2-hydroxyhexadecanoic acid, 16-hydroxyhexadecanoic acid, 2-hydroxydodecanoic acid, 9,10-dihydroxyundecanoic acid, 3,11-dihydroxytetradecanoic acid, 11-hydroxytetradecanoic acid, 16-hydroxypalmitic acid, 14-hydroxypalmitic acid, 2-hydroxypalmitic acid and combinations thereof; and
 (b) said oil is selected from the group consisting of 1-eicosene and mineral oil.

32. The thermally activated transfer ribbon as recited in claim 20, said ink composition further comprising:
 (a) a plasticizer present in an amount of from about 9% to about 16% by weight of the total ink nonvolatile components;
 (b) a thickener present in an amount of from about 1% to about 3% by weight of the total ink nonvolatile components;
 (c) a dispersant present in an amount of from about 0.1% to about 0.2% by weight of the total ink nonvolatile components; and
 (d) a pigment present in an amount of from about 15% to about 25% by weight of the total ink nonvolatile components.

33. The thermally activated transfer ribbon as recited in claim 31 wherein said polymer is a polyamide resin.

34. The thermally activated transfer ribbon as recited in claim 32 wherein said ink composition is applied to said substrate utilizing a solvent for the polymer, said solvent being present in an amount of from about 50% to about 85% by weight of the total ink composition.

35. The thermally activated transfer ribbon as recited in claim 34 wherein said solvent is a combination of toluene and isopropyl alcohol, said toluene and isopropyl alcohol being present in a ratio of toluene to isopropyl alcohol of about 3:1.

36. The ink composition as recited in claim 34 wherein said polymer is a styrene-allyl alcohol copolymer, said solvent is toluene and said plasticizer is selected from the group consisting of dioctyl phthalate and benzyl butyl phthalate.

37. The thermally activated transfer ribbon as recited in claim 31 or 33 wherein:
(a) said thickener is selected from the group consisting of fumed silica and hydrophobic fumed silica;
(b) said dispersant is lecithin; and
(c) said pigment is selected from the group consisting of carbon black, alkali blue and iron blue.

38. The thermally activated transfer ribbon as recited in claim 31 or 33 said ink composition further comprising a color toner.

39. The thermally activated ink composition as recited in claim 20, 21, 22, 23 or 24 wherein said said substrate material is selected from the group consisting of polyester, polyethylene, polypropylene or polyvinylchloride and said substrate has a thickness of from about 0.12 mil to about 0.75 mil.

40. The thermally activated transfer ribbon as recited in claim 21, 22, 23, 24, 32 or 36 wherein said ink is applied to said substrate as a hot-melt.

41. In a method of generating printed characters on ordinary paper with a thermal print head, the improvement comprising aligning a thermally activated transfer ribbon adjacent the thermal print head, said thermally activated transfer ribbon positioned between said print head and the surface to be printed upon and said thermally activated transfer ribbon comprising a substrate and an ink composition as recited in claim 25, 26, 27, 28, 29, 30, or 39, said ink composition forming a film on one side of said substrate adjacent the surface to be printed upon.

* * * * *

UNITED STATES PATENT AND TRADEMARK OFFICE
CERTIFICATE OF CORRECTION

PATENT NO. : 4,251,276
DATED : February 17, 1981
INVENTOR(S) : William I. Ferree, Jr. et al It is certified that error appears in the above-identified patent and that said Letters Patent are hereby corrected as shown below:

Column 6, line 67, change "fact" to --face--.
Column 8, line 50, change "blue" to --blue$^7$--.
Column 11, line 39, change "claim 2" to --claim 21--.
Column 12, line 15, change "30" to --25--.

Signed and Sealed this

Thirtieth Day of June 1981

[SEAL]

Attest:

RENE D. TEGTMEYER

*Attesting Officer*  *Acting Commissioner of Patents and Trademarks*